(12) United States Patent
Lee et al.

(10) Patent No.: US 10,899,191 B2
(45) Date of Patent: Jan. 26, 2021

(54) HEATING AND COOLING SYSTEM FOR VEHICLE

(71) Applicants: Hyundai Motor Company, Seoul (KR); Kia Motors Corporation, Seoul (KR)

(72) Inventors: Sang Shin Lee, Gyeonggi-do (KR); Man Ju Oh, Gyeonggi-do (KR); So Yoon Park, Gyeonggi-do (KR); Jae Woong Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 92 days.

(21) Appl. No.: 16/195,939

(22) Filed: Nov. 20, 2018

(65) Prior Publication Data

US 2020/0031194 A1 Jan. 30, 2020

(30) Foreign Application Priority Data

Jul. 25, 2018 (KR) .................. 10-2018-0086815

(51) Int. Cl.
*B60H 1/00* (2006.01)

(52) U.S. Cl.
CPC ..... *B60H 1/00392* (2013.01); *B60H 1/00278* (2013.01); *B60H 1/00914* (2013.01);
(Continued)

(58) Field of Classification Search
CPC .. B60H 1/00; B60H 1/00007; B60H 1/00278; B60H 1/00385; B60H 1/00392; B60H 1/00885; B60H 1/00899; B60H 1/00914; B60H 1/142; B60H 1/32; B60H 1/2215; B60H 1/3227; B60H 2001/00307;
(Continued)

(56) References Cited

U.S. PATENT DOCUMENTS

| 10,573,940 B2 * | 2/2020 | Dunham | ........... H01M 10/6567 |
| 2014/0041826 A1 * | 2/2014 | Takeuchi | ........... B60H 1/00899 165/10 |

(Continued)

FOREIGN PATENT DOCUMENTS

| JP | 5297154 B2 | 9/2013 |
| JP | 5955673 B2 | 7/2016 |

(Continued)

*Primary Examiner* — Len Tran
*Assistant Examiner* — Gustavo A Hincapie Serna
(74) *Attorney, Agent, or Firm* — Mintz Levin Cohn Ferris Glovsky and Popeo, P.C.; Peter F. Corless

(57) ABSTRACT

A heating and cooling system for a vehicle may include: a refrigerant line provided to pass through a compressor, an interior heat exchanger for interior air-conditioning, an air-cooled condenser, and an evaporator core for interior air-conditioning, the refrigerant line configured such that a refrigerant flows therethrough; a coolant line provided to pass through a high-voltage battery core, an electric part core for an electric part, and a radiator for the electric part, the coolant line configured such that a coolant flows therethrough; and a heat exchanging part configured to exchange heat between the refrigerant flowing between the interior heat exchanger and the air-cooled condenser, and the coolant flowing between the electric part core and the radiator.

14 Claims, 8 Drawing Sheets

(52) U.S. Cl.
CPC .............. *B60H 2001/00307* (2013.01); *B60H 2001/00928* (2013.01)

(58) Field of Classification Search
CPC ........... B60H 2001/00928; B60L 58/24; B60L 58/26; B60L 58/27; B60L 2240/00; B60L 2240/36; H01M 10/625
USPC ........................................................ 165/202
See application file for complete search history.

(56) References Cited

U.S. PATENT DOCUMENTS

| | | | | |
|---|---|---|---|---|
| 2014/0326430 | A1* | 11/2014 | Carpenter | B60L 1/02 165/41 |
| 2016/0344075 | A1* | 11/2016 | Blatchley | B60W 20/15 |
| 2017/0197488 | A1* | 7/2017 | Kim | H01M 10/625 |
| 2017/0240024 | A1* | 8/2017 | Blatchley | B60H 1/00921 |
| 2018/0117986 | A1* | 5/2018 | Kim | B60K 1/04 |
| 2018/0162193 | A1* | 6/2018 | Horn | B60H 1/00907 |
| 2019/0047369 | A1* | 2/2019 | Kim | F25B 25/005 |
| 2019/0118610 | A1* | 4/2019 | Johnston | B60H 1/00899 |
| 2019/0135071 | A1* | 5/2019 | Hwang | B60H 1/00921 |
| 2019/0135075 | A1* | 5/2019 | Hwang | B60H 1/32281 |
| 2019/0225047 | A1* | 7/2019 | Porras | B60H 1/323 |
| 2020/0047586 | A1* | 2/2020 | Gonze | B60H 1/00899 |

FOREIGN PATENT DOCUMENTS

| | | |
|---|---|---|
| KR | 101448656 B1 | 10/2014 |
| KR | 101628120 B1 | 6/2016 |
| KR | 101752760 B1 | 6/2017 |

\* cited by examiner

HEATING AND COOLING SYSTEM FOR VEHICLE

CROSS REFERENCE TO RELATED APPLICATION

The present application claims the benefit of priority to Korean Patent Application No. 10-2018-0086815, filed on Jul. 25, 2018 in the Korean Intellectual Property Office, the entire contents of which are incorporated herein by reference.

BACKGROUND

1. Technical Field

The present disclosure relates generally to a heating and cooling system for a vehicle and, more particularly, to a heating and cooling system for a vehicle capable of improving interior air-conditioning efficiency.

2. Description of the Related Art

Development of eco-friendly technologies to address problems such as energy exhaustion has recently emerged. Electric vehicles are a common eco-friendly countermeasure against these problems.

Conventional electric vehicles are driven by a motor that receives electricity from a battery to output power. Electric vehicles do not discharge carbon dioxide, they generate little noise, and energy efficiency of the motor is higher than that of an internal combustion engine.

The key technology for realizing the electric vehicle is a battery module. Recently, research has been conducted on such battery modules to reduce the weight, size, and charging time thereof.

Most battery modules may achieve optimum performance and long lifespan when it is used in an optimal temperature environment. However, it can be difficult to create the optimal temperature environment due to heat generated during driving as well as external temperature changes.

Generally, the vehicle cabin must be warmed to improve charge/discharge performance of the battery during cold weather. Since the electric vehicle does not have a source of waste heat like traditional vehicles which generate heat during combustion of an internal combustion engine, it relies on an electric heater to perform interior heating of the vehicle. Thus, in order to maintain the optimum temperature environment for the battery module, conventional electric vehicles operate a heating and cooling system for controlling the temperature of the battery module separate from a heating and cooling system for an interior of the vehicle. In other words, the electric vehicle may have two independent cooling and heating systems, one for interior heating and cooling, and the other for the purpose of controlling the temperature of the battery module.

However, since energy is not efficiently managed when the heating and cooling systems are operated in the above-described manner, the electric vehicle is unable to drive long distances due to a short cruising range, reducing the driving distance by 30% while cooling the vehicle in the summer, and by 40% or more while heating the vehicle in the winter. If a high-capacity PTC (positive temperature coefficient) heater is provided to solve the problem while heating, another problem can arise in that the use of a heat pump become excessive.

Accordingly, a heating and cooling system for interior air-conditioning, a battery heating and cooling system, and an electric system to exchange heat with each other has been proposed to improve heating efficiency. However, if precise coordination control of heating logic and battery temperature raising logic is not performed (because a main operation temperature (e.g., 80° C. or more) of a heater and a temperature (e.g., 50° C.) of a battery temperature raising are different from each other), there is a problem that a high-temperature coolant flows into the battery, causing damage thereto.

The contents described as the related art have been provided only to assist in understanding the background of the present disclosure and should not be considered as corresponding to the related art known to those having ordinary skill in the art.

SUMMARY

An object of the present disclosure is to provide a heating and cooling system for a vehicle capable of efficiently heating and cooling the vehicle interior, efficiently raising the temperature of the vehicle battery, and efficiently cooling the battery by exchanging heat between a refrigerant for interior air-conditioning and a coolant circulating through an electric part core and a high-voltage battery core.

According to embodiments of the present disclosure, a heating and cooling system for a vehicle may include: a refrigerant line provided to pass through a compressor, an interior heat exchanger for interior air-conditioning, an air-cooled condenser, and an evaporator core for interior air-conditioning, the refrigerant line configured such that a refrigerant flows therethrough; a coolant line provided to pass through a high-voltage battery core, an electric part core for an electric part, and a radiator for the electric part, the coolant line configured such that a coolant flows therethrough; and a heat exchanging part configured to exchange heat between the refrigerant flowing between the interior heat exchanger and the air-cooled condenser, and the coolant flowing between the electric part core and the radiator.

The heating and cooling system of a vehicle may further include a first refrigerant bypass line having an end branched from a point between the heat exchanging part and the air-cooled condenser and another end connected to a point between the air-cooled condenser and the evaporator core.

The heating and cooling system of a vehicle may further include a first opening and shutting valve provided on a line passing through the first refrigerant bypass line or the air-cooled condenser, the first opening and shutting valve configured to adjust the refrigerant flowing through the first refrigerant bypass line or the air-cooled condenser; and a control unit configured to control the first opening and shutting valve so as to deliver the refrigerant to the air-cooled condenser when an interior cooling mode is executed.

The heating and cooling system of a vehicle may further include a first opening and shutting valve; and a control unit configured to control the first opening and shutting valve so that the refrigerant flows through the first refrigerant bypass line when an interior heating mode using electric waste heat is executed and so that the refrigerant flows through the air-cooled condenser when an interior heating mode using the open air heat is executed.

The heating and cooling system of a vehicle may further include a second refrigerant bypass line having an end branched from a point between the air-cooled condenser and the evaporator core and another end connected to an upstream point of the compressor.

The heating and cooling system of a vehicle may further include a second opening and shutting valve installed at an end of the second refrigerant bypass line, the second opening and shutting valve configured to deliver the refrigerant supplied from the air-cooled condenser to the evaporator core or the second refrigerant bypass line; and a control unit configured to control the second opening and shutting valve so as to deliver the refrigerant to the second refrigerant bypass line when an interior heating mode is executed, and to control the second opening and shutting valve so as to deliver the refrigerant to the evaporator core when an interior cooling mode is executed.

The heating and cooling system of a vehicle may further include a first coolant bypass line having an end branched from a point between the heat exchanging part and the radiator and another end connected to a downstream point of the radiator.

The heating and cooling system of a vehicle may further include a third opening and shutting valve installed at an end of the first coolant bypass line, the third opening and shutting valve configured to deliver the coolant supplied from the heat exchanging part the radiator or the first coolant bypass line; and a control unit configured to control the third opening and shutting valve so as to deliver the coolant to the first coolant bypass line when an interior heating mode is executed, and to control the third opening and shutting valve so as to deliver the coolant to the radiator when an interior cooling mode is executed.

The heating and cooling system of a vehicle may further include a water heating heater and a battery chiller are sequentially provided downstream of the high-voltage battery core on the coolant line.

The heating and cooling system of a vehicle may further include a battery refrigerant supplying line having an end branched from a point between the air-cooled condenser and the evaporator core and another end connected to the battery chiller to supply the refrigerant to the battery chiller; and a battery refrigerant discharging line connecting the battery chiller to the compressor, the battery refrigerant discharging line configured to supply the refrigerant discharged from the battery chiller to the compressor.

The heating and cooling system for a vehicle may further include a fourth opening and shutting valve installed on the battery refrigerant supplying line, the fourth opening and shutting valve configured to control a flow of the refrigerant; and a control unit configured to control the fourth opening and shutting valve so as to open only when a battery refrigerant cooling mode is executed.

The heating and cooling system of a vehicle may further include second and third coolant bypass lines each having an end branched from a point between the radiator for the electric part and the high-voltage battery core and another end branched from a point between the electric part core and the battery chiller, the second and third coolant bypass lines connected in parallel to each other.

The heating and cooling system of a vehicle may further include a fifth opening and shutting valve installed at an end of the second coolant bypass line, the fifth opening and shutting valve configured to deliver the coolant supplied from the radiator for the electric part to the second coolant bypass line or the high-voltage battery core; a sixth opening and shutting valve installed at an end of the third coolant bypass line, the sixth opening and shutting valve configured to deliver the coolant supplied from the battery chiller to the third coolant bypass line or the electric part core; and a control unit configured to control the fifth and sixth opening and shutting valves so as to deliver the coolant to the second and third coolant bypass lines, respectively, when an interior heating mode and a battery temperature raising mode are executed, or when an interior cooling mode and an electric part cooling mode are executed, or when the interior cooling mode and a battery refrigerant cooling mode are executed.

The control unit may control the fifth and sixth opening and shutting valves so as to deliver the coolant to the high-voltage battery core and the electric part core, respectively, when the interior heating mode is executed using open air and electric waste heat or using only the electric waste heat, or when the interior cooling mode is executed to cool the radiator and the battery coolant.

The heating and cooling system of a vehicle may further include water pumps provided upstream of the electric part core and the high-voltage battery core on the coolant line, respectively.

BRIEF DESCRIPTION OF THE DRAWINGS

The embodiments herein may be better understood by referring to the following description in conjunction with the accompanying drawings, briefly described below, in which like reference numerals indicate identically or functionally similar elements.

Figure 1:
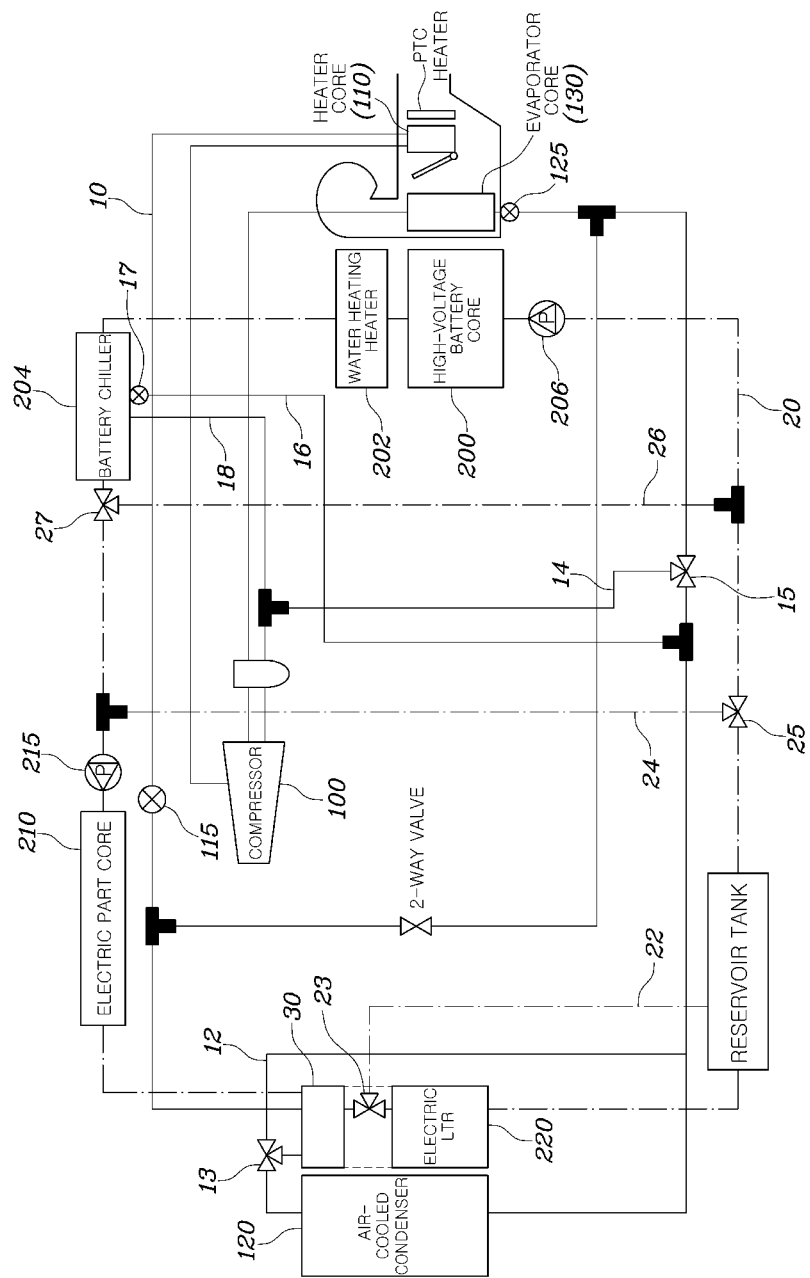
FIG. 1 is a view illustrating a heating and cooling system for a vehicle according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, devices, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, a heating and cooling system for a vehicle according to embodiments of the present disclosure will be described with reference to the accompanying drawings.

FIG. 1 is a view illustrating a heating and cooling system for a vehicle according to embodiments of the present disclosure.

As shown in FIG. 1, a heating and cooling system for a vehicle according to embodiments of the present disclosure may include a refrigerant line 10 provided to pass through a compressor 100, an interior heat exchanger 110 for interior air-conditioning, an air-cooled condenser 120, and an evaporator core 130 for interior air-conditioning an interior of the vehicle, and through which a refrigerant flows; a coolant line (alternatively referred to herein as "cooling water line") 20 provided to pass through a high-voltage battery core 200, an electric part core 210, and a radiator for the electric part 220, and through which a coolant (alternatively referred to herein as "cooling water") flows; and a heat exchanging part 30 for exchanging heat between the refrigerant flowing between the interior heat exchanger (alternatively referred to herein as "indoor heat exchanger") 110 and the air-cooled condenser 120, and the coolant flowing between the electric part core 210 and the radiator for the electric part 220.

That is, according to embodiments of the present disclosure, the heat is exchanged between the refrigerant line 10 provided to the interior air-conditioning and the coolant line 20 provided to cool a high-voltage battery and an electric part through the heat exchanging part 30, thereby maximizing air-conditioning efficiency of interior heating and cooling depending on a vehicle mode and effectively performing the temperature raising or cooling of the battery.

The electric part core 210 may include electric parts such as an on board charger (OBC), a motor, an electric power control unit (EPCU), and the like. In FIG. 1, the refrigerant line 10 is illustrated by a solid line and the coolant line 20 is illustrated by a dashed dotted line.

Specifically, the heating and cooling system for a vehicle according to embodiments of the present disclosure may further include a first refrigerant bypass line 12 having one end branched from a point between the heat exchanging part 30 and the air-cooled condenser 120 and the other end connected to a downstream point of the air-cooled condenser 120.

That is, a refrigerant flowing through the refrigerant line 10 may also flow to the air-cooled condenser 120 after passing through the heat exchanging part 30, and may also flow through the first refrigerant bypass line 12 without passing through the air-cooled condenser 120.

In this case, the heating and cooling system for a vehicle may further include a first opening and shutting valve 13 which is installed at one end or the other end of the first refrigerant bypass line 12 and is operative to deliver the refrigerant supplied from the heat exchanging part 30 to any one of the air-cooled condenser 120 or the first refrigerant bypass line 12; and a control unit (not shown) performing a control so that the first opening and shutting value 13 delivers the refrigerant to the air-cooled condenser 120 when an interior heating mode or an interior cooling mode using the open air and the electric waste heat is executed, and performing a control so that the first opening and shutting value 13 delivers the refrigerant to the first refrigerant bypass line 12 when the interior heating mode using only the electric waste heat is executed.

That is, according to embodiments of the present disclosure, the first opening and shutting valve 13, which is a three-way valve, that operates to pass or bypass the refrigerant through the air-cooled condenser 120 depending on an interior air-conditioning mode is provided, thereby making it possible to efficiently perform a heat management of the refrigerant and the coolant. A detailed operation of each mode will be described later. In addition, the first opening and shutting valve and other valves may perform both a function of switching a direction of a flow path and a function of controlling a flow rate, if necessary.

The heating and cooling system for a vehicle according to embodiments of the present disclosure may further include a second refrigerant bypass line 14 having one end branched from a point between the air-cooled condenser 120 and the evaporator core 130, and the other end connected to an upstream point of the compressor 100.

Further, the heating and cooling system for a vehicle may further include a second opening and shutting valve 15 which is installed at one end of the second refrigerant bypass line 14 and is operative to deliver the refrigerant supplied from the air-cooled condenser 120 to any one of the evaporator core 130 or the second refrigerant bypass line 14; and a control unit (not shown) performing a control so that the second opening and shutting valve 15 delivers the refrigerant to the second refrigerant bypass line 14 when the interior heating mode is executed and performing a control so that the second opening and shutting valve 15 delivers the refrigerant to the evaporator core 130 when the interior cooling mode is executed.

That is, the second opening and shutting valve 15, which is a three-way valve, that operates so that the refrigerant is cooled through the evaporator core 130 or bypasses the evaporator core 130 to maintain the heat depending on an interior air-conditioning mode is provided, thereby making it possible to efficiently perform a heat management of the refrigerant and the coolant.

The heating and cooling system for a vehicle according to embodiments of the present disclosure may further include a first coolant bypass line 22 having one end branched from a point between the heat exchanging part 30 and the radiator for the electric part 220 and the other end connected to a downstream point of the radiator for the electric part 220.

In addition, the heating and cooling system for a vehicle may further include a third opening and shutting valve 23 which is installed at one end or the other end of the first coolant bypass line 22 and is operative to deliver the coolant supplied from the heat exchanging part 30 to any one of the radiator for the electric part 220 or the first coolant bypass line 22; and a control unit (not shown) performing a control so that the third opening and shutting valve 23 delivers the coolant to the first coolant bypass line 22 when the interior heating mode is executed and performing a control so that the third opening and shutting valve 23 delivers the coolant to the radiator for the electric part 220 when the interior cooling mode is executed.

That is, the third opening and shutting valve 23, which is a three-way valve, that operate so that the coolant is cooled by the open air while passing through the radiator for the electric part 220, or bypasses the radiator for the electric part 220 and flows while maintaining the temperature thereof depending on the interior air-conditioning mode may be provided.

In particular, a water heating heater 202 and a battery chiller 204 may be sequentially provided to downstream points of the high-voltage battery core 200 on the cooling line 20 according to embodiments of the present disclosure.

Here, the water heating heater 202 refers to an apparatus capable of electrically heating the coolant, and the battery chiller 204 refers to an apparatus that exchanges heat between the flowing coolant and the refrigerant circulated for interior air-conditioning.

In this case, the heating and cooling system for a vehicle according to embodiments of the present disclosure may further include a battery refrigerant supplying line 16 having one end branched from a point between the air-cooled condenser 120 and the evaporator core 130 and the other end connected to the battery chiller 204 to supply the refrigerant to the battery chiller 204; and a battery refrigerant discharging line 18 provided to connect the battery chiller 204 and the compressor 100 to each other to supply the refrigerant discharged from the battery chiller 204 to the compressor 100. Here, the battery refrigerant discharging line 18 is provided to be connected to an upstream point of the compressor 100.

In addition, the heating and cooling system for a vehicle may further include a fourth opening and shutting valve 17 installed on the battery refrigerant supplying line 16 to control the flow of the refrigerant; and a control unit (not shown) performing a control so that the fourth opening and shutting valve 17 is opened only when a battery refrigerant cooling mode is executed.

That is, according to embodiments of the present disclosure, the fourth opening and shutting valve 17, which a two-way valve, that operate to supply the refrigerant to the battery refrigerant supplying line 16 depending on the vehicle mode that exchanges heat between the refrigerant and the coolant through the battery chiller 204 is provided.

In addition, the heating and cooling system for a vehicle according to embodiments of the present disclosure may further include second and third coolant bypass lines 24 and 26 each having one end branched from a point between the radiator for the electric part 220 and the high-voltage battery core 200 and the other end branched from a point between the electric part core 210 and the battery chiller 204, and connected in parallel to each other.

In this case, the heating and cooling system for a vehicle according to embodiments of the present disclosure may further include a fifth opening and shutting valve 25 which is installed at one end or the other end of the second coolant bypass line 24 and is operative to deliver the coolant supplied from the radiator for the electric part 220 to any one of the second coolant bypass line 24 or the high-voltage battery core 200; a sixth opening and shutting valve 27 which is installed at one end or the other end of the third coolant bypass line 26 and is operative to deliver the coolant supplied from the battery chiller 204 to any one of the third coolant bypass line 26 or the electric part core 210; and a control unit (not shown) performing a control so that the fifth and sixth opening and shutting valves 25 and 27 deliver the coolant to the second and third coolant bypass lines 24 and 26, respectively, in the case of a mode in which an interior heating and a battery temperature raising are executed, or a mode in which an interior cooling and an electric part cooling, or an interior cooling and a battery refrigerant cooling are executed, and performing a control so that the fifth and sixth opening and shutting valves 25 and 27 deliver the coolant to the high-voltage battery core 200 and the electric part core 210, respectively, in the case of an interior heating mode using the open air and electric waste heat or using only the electric waste heat, or an interior cooling mode in which the cooling of the radiator for the electric part 220 and the battery coolant is executed.

Therefore, the fifth and sixth opening and shutting valves 25 and 27 are controlled depending on the vehicle mode so that the coolant circulates while sharing the electric part core 210 and the high-voltage battery core 200, or circulates through the electric part core 210 and the high-voltage battery core 200 while forming different closed circuits, thereby making it possible to efficiently control temperatures of the refrigerant, the coolant, and the battery.

Here, it is preferable that when the fifth opening and shutting valve is installed at one end of the second coolant bypass line 24, the sixth opening and shutting valve 27 is installed at the other end of the third coolant bypass line 26, and when the fifth opening and shutting valve 25 is installed at the other end of the second coolant bypass line 24, the sixth opening and shutting valve 27 is installed at one end of the third coolant bypass line 26.

Here, all of the fifth and sixth opening and shutting valves 25 and 27 are provided as a three-way valve.

Further, according to embodiments of the present disclosure, water pumps 206 and 215 may be provided to upstream points of the electric part core 210 and the high-voltage battery core 200 on the coolant line 20, respectively.

That is, when the high-voltage battery core 200 and the electric part core 210 have coolant closed circuits different from each other by operations of the fifth and sixth opening and shutting valves 25 and 27, the cooling line 20 may circulate the coolant through the water pumps 206 and 215 provided in the respective closed circuits.

Further, expansion valves 115 and 125 may be provided to upstream points of the evaporator core 130 and the heat exchanging part 30 on the refrigerant line 10, respectively. As a result, an effect of partially lowering a pressure and a temperature of the circulated refrigerant may be achieved.

According to embodiments of the present disclosure, the operation of the heating and cooling system for a vehicle is varied depending on the vehicle mode. Therefore, the operation of the heating and cooling system for a vehicle according to embodiments of the vehicle mode will be hereinafter described in detail with reference to the accompanying drawings. A solid line refers to a flow of the refrigerant and a dashed dotted line refers to a flow of the coolant.

Figure 2:
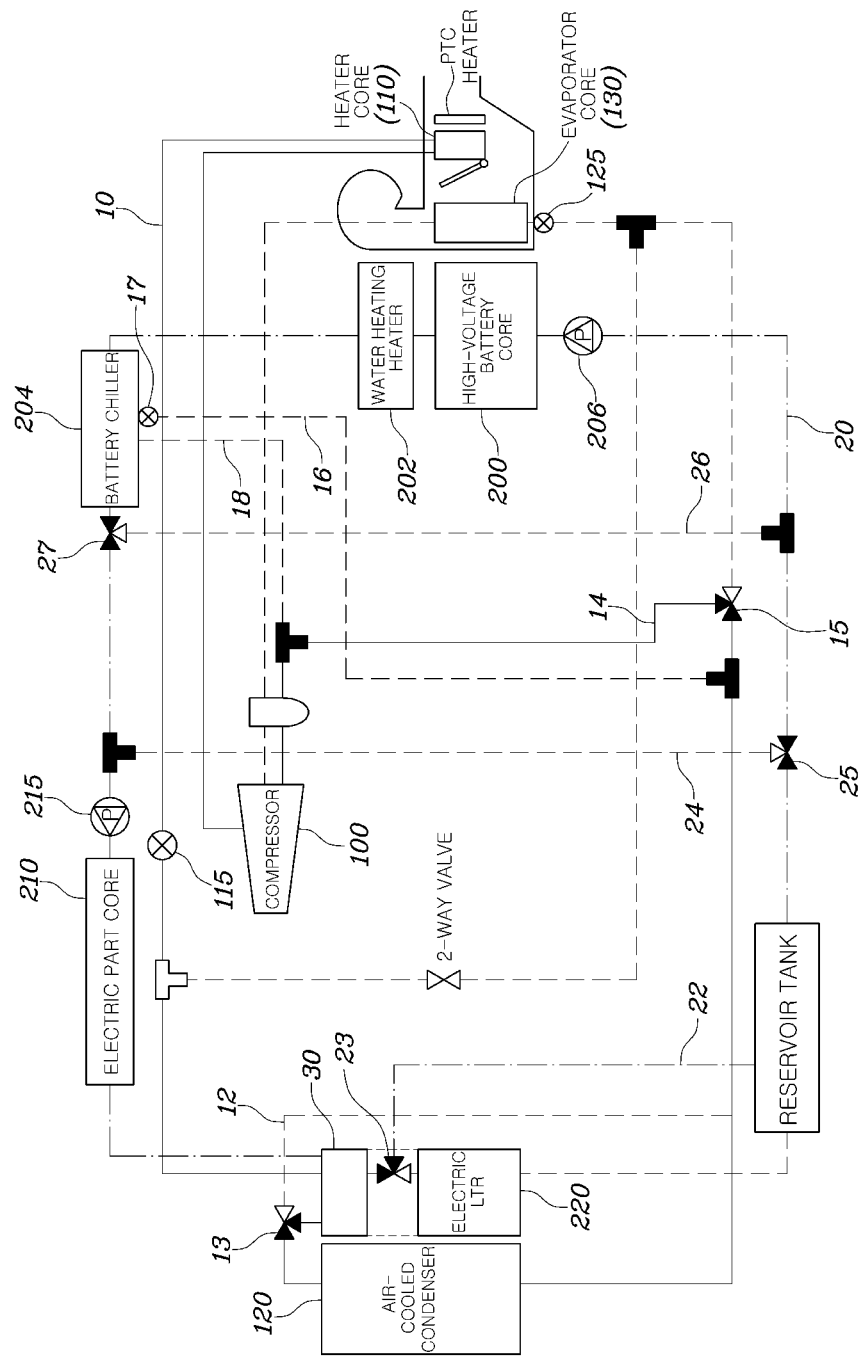
FIG. 2 is a view illustrating an operation of a heating and cooling system for a vehicle when an interior heating mode is performed using open air and electric waste heat according to embodiments of the present disclosure.

FIG. 2 is a view illustrating an operation of a heating and cooling system for a vehicle when an interior heating mode is performed using open air and electric waste heat according to embodiments of the present disclosure.

As shown in FIG. 2, in the heating and cooling system for a vehicle performing an interior heating mode using the open air and the electric waste heat, the first opening and shutting valve 13 operates so that the refrigerant passes through the heat exchanging part 30 and is delivered to the air-cooled condenser 120, and the second opening and shutting valve 15 operates so that the refrigerant is directly delivered to the compressor 100 without passing through the evaporator core 130.

That is, in a situation in which the interior heating is performed, when the temperature of the refrigerant is higher than temperature of the open air, the temperature of the refrigerant raises while passing through the air-cooled condenser 120, and is maintained while passing through the evaporator core 130, thereby making it possible to raise a temperature of the interior air-conditioning air through the interior heat exchanger 110.

In this case, the third opening and shutting valve 23 operates so that the coolant passing through the heat exchanging part 30 bypasses the radiator for the electric part 220, and the fifth and sixth opening and shutting valves 25 and 27 operate so that the electric part core 210 and the high-voltage battery core 200 form a single closed circuit. As a result, the coolant absorbs the electric waste heat and the battery waste heat.

Therefore, the coolant absorbing the waste heat raises the temperature of the refrigerant through the heat exchanging part 30, thereby making it possible to further increase an interior heating effect without separately consuming energy.

Figure 3:
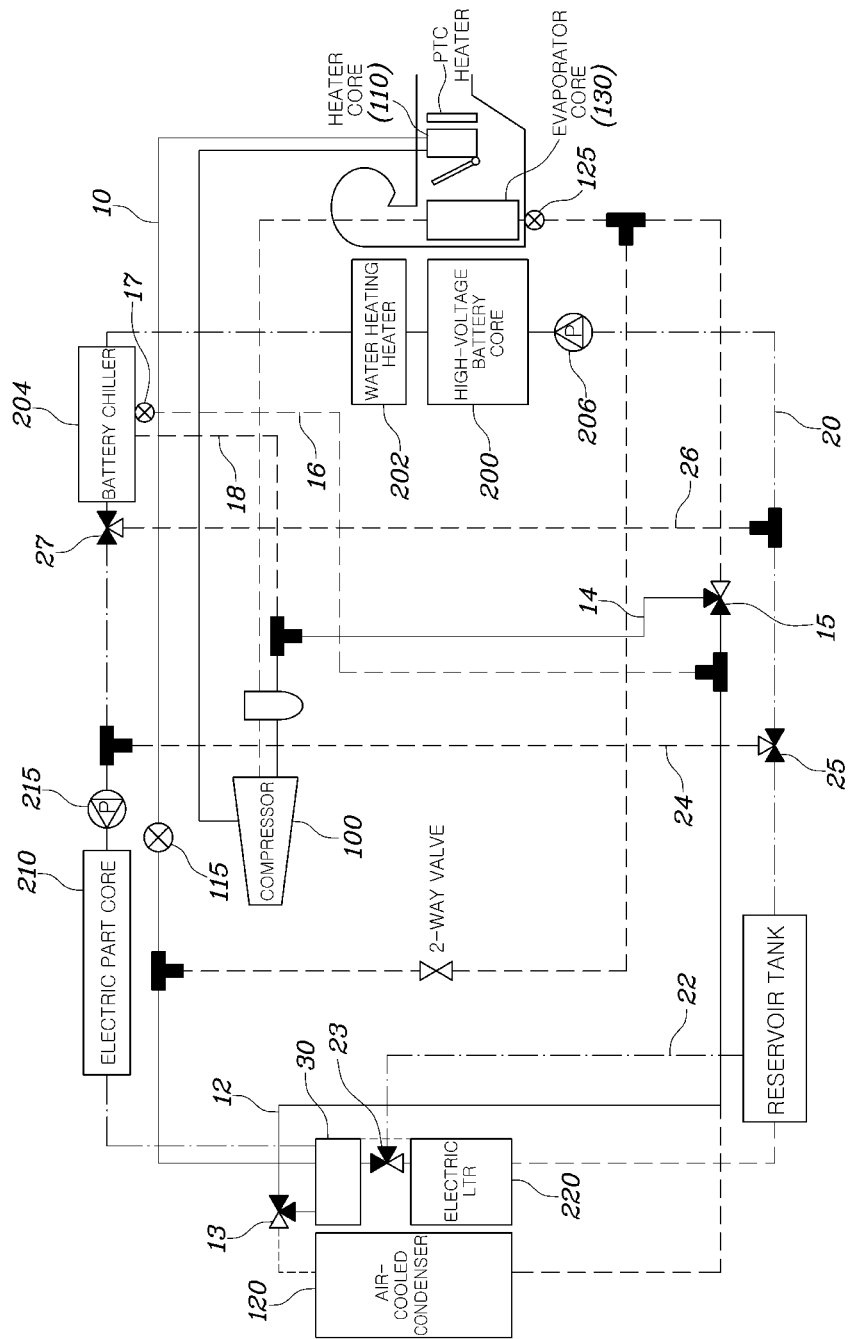
FIG. 3 is a view illustrating an operation of a heating and cooling system for a vehicle when an interior heating mode is performed using only electric waste heat according to embodiments of the present disclosure.

Meanwhile, there is a condition in which the heating may not performed through the open air heat source because the temperature of the open air is lower than the temperature of the refrigerant. FIG. 3 is a view illustrating an operation of a heating and cooling system for a vehicle when an interior heating mode is performed using only electric waste heat according to embodiments of the present disclosure.

When the interior heating is performed using only the electric waste heat excluding the open air heat, the heating and cooling system for a vehicle operates as illustrated in FIG. 3.

That is, the first opening and shutting valve 13 controls the flow of the refrigerant so that the refrigerant bypasses the air-cooled condenser 120, thereby allowing the open air heat source not to be absorbed through the air-cooled condenser 120. Therefore, even in the situation in which the temperature of the open air is low, the interior heating air-conditioning may be effectively performed without heat loss.

Figure 4:
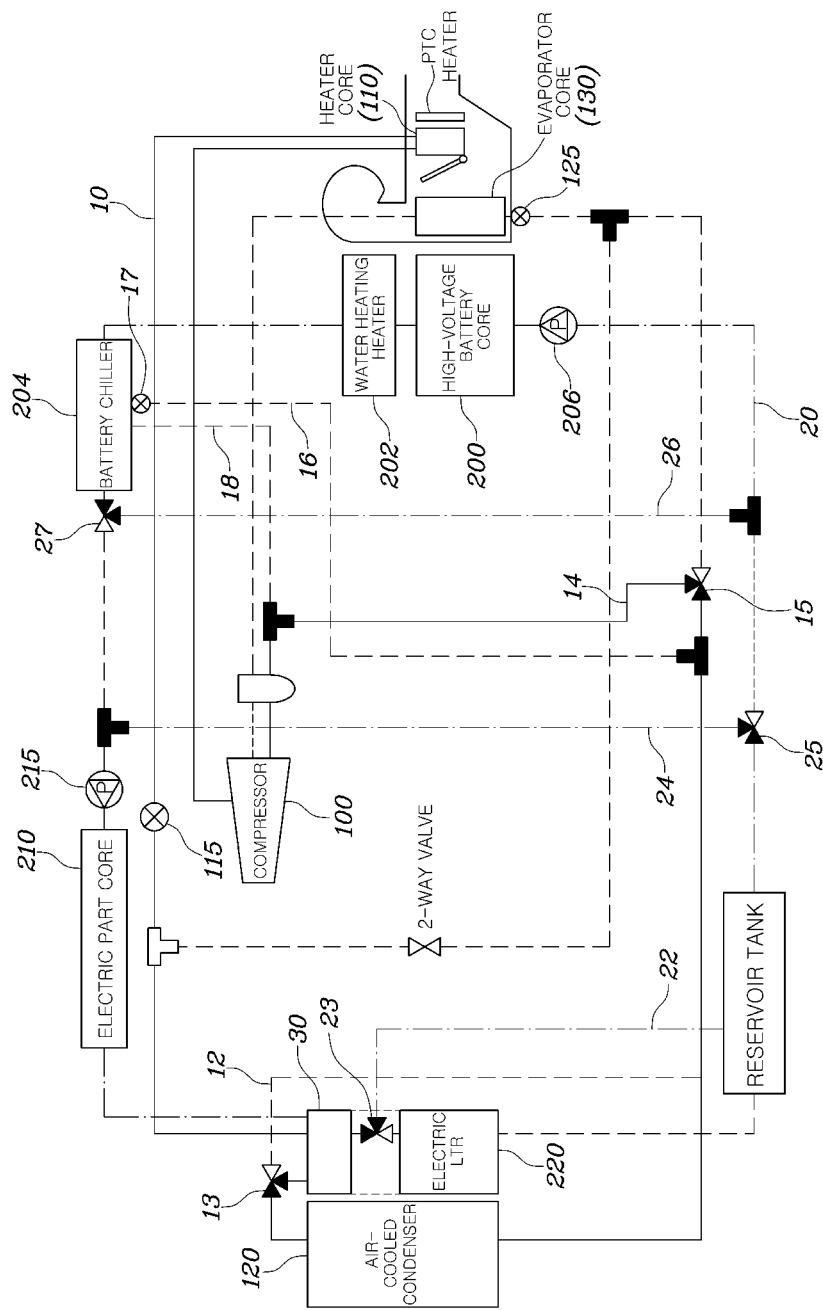
FIG. 4 is a view illustrating an operation of a heating and cooling system for a vehicle when interior heating and battery temperature raising modes are performed using open air and electric waste heat according to embodiments of the present disclosure.

FIG. 4 is a view illustrating an operation of a heating and cooling system for a vehicle when interior heating and battery temperature raising modes are performed using open air and electric waste heat according to embodiments of the present disclosure.

As shown in FIG. 4, in the case in which the interior heating and battery temperature raising mode using the open air and the electric waste heat is executed, the first opening and shutting valve 13 operates so that the refrigerant passes through the heat exchanging part 30 and is delivered to the air-cooled condenser 120, and the second opening and shutting valve 15 operates so that the refrigerant is directly delivered to the compressor 100 without passing through the evaporator core 130, thereby minimizing thermal loss of the refrigerant.

Meanwhile, the third opening and shutting valve 23 operates so that the coolant passing through the heat exchanging part 30 bypasses the radiator for the electric part 220 and the fifth and sixth opening and shutting valves 25 and 27 operate so that the electric part core 210 and the high-voltage battery core 200 form closed circuits different from each other. As a result, the coolant absorbing the electric heat exchanges the heat with the refrigerant, and the temperature of the high-voltage battery core 200 is raised as the coolant heated by the water heating heater 202 which is electrically operated circulates.

Therefore, the temperature of the refrigerant for interior air-conditioning is raised to the temperature of the open air through the air-cooled condenser 120, and may be effectively raised to the temperature of the coolant absorbing the electric waste heat though the heat exchanging part 30.

Figure 5:
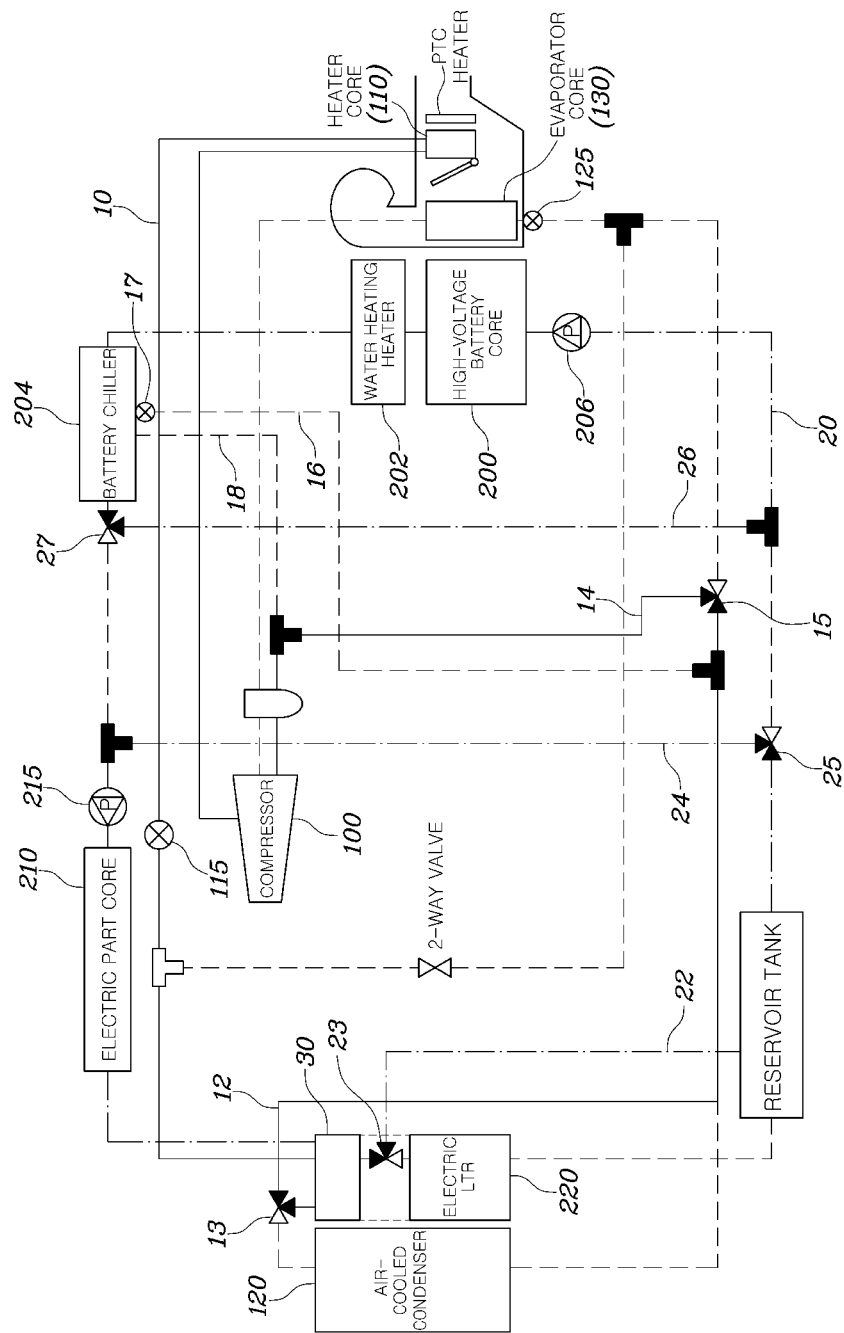
FIG. 5 is a view illustrating an operation of a heating and cooling system for a vehicle when interior heating and battery temperature raising modes are performed using only electric waste heat according to embodiments of the present disclosure.

Meanwhile, FIG. 5 is a view illustrating an operation of a heating and cooling system for a vehicle when interior heating and battery temperature raising modes are performed using only electric waste heat according to embodiments of the present disclosure.

As shown in FIG. 5, in the case of the interior heating and battery temperature raising mode using only the electric waste heat, the heating and cooling system for a vehicle operates the first opening and shutting valve 13 so that the refrigerant bypasses the air-cooled condenser 120, thereby preventing the heat from being exchanged between the open air and the refrigerant.

In more detail, in all interior heating modes described above, a temperature control door in HVAC operates so that the air-conditioning air maximally passes through the interior heat exchanger 110, thereby maximizing heating efficiency.

Figure 6:
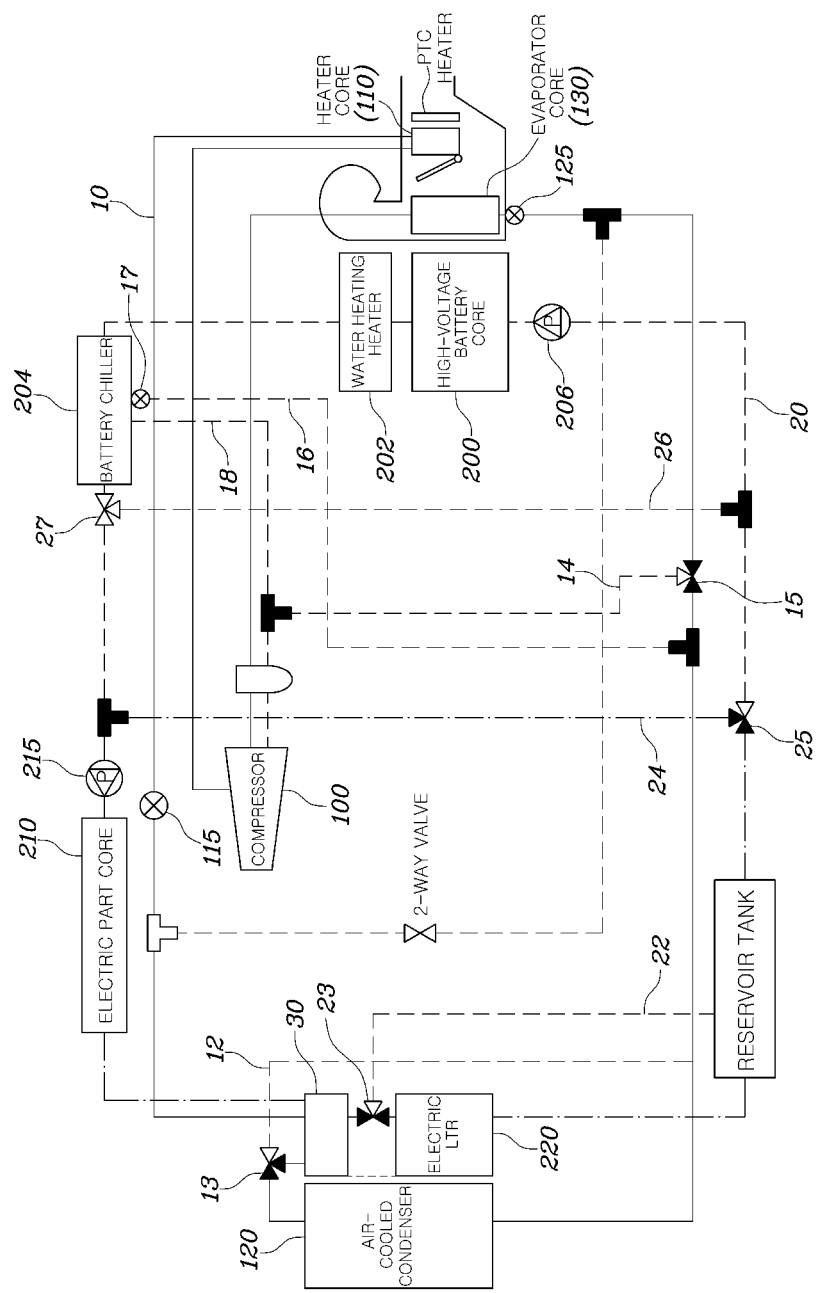
FIG. 6 is a view illustrating an operation of a heating and cooling system for a vehicle when an interior cooling mode including an electric part cooling is performed according to embodiments of the present disclosure.

FIG. 6 is a view illustrating an operation of a heating and cooling system for a vehicle when an interior cooling mode including an electric part cooling is performed according to embodiments of the present disclosure.

As shown in FIG. 6, when the interior cooling mode including the electric part cooling is executed, the first opening and shutting valve 13 operates so that the refrigerant passes through the air-cooled condenser 120, and the second opening and shutting valve 15 operates so that the refrigerant passes through the evaporator core 130.

Therefore, the refrigerant is maximally cooled while passing through both the air-cooled condenser 120 and the evaporator core 130, thereby making it possible to maximize cooling efficiency.

Meanwhile, the third opening and shutting valve 23 operates so that the coolant passes through the radiator for the electric part 220, and the fifth opening and shutting valve 25 operates so that the coolant forms a closed circuit including the electric part core 210, the heat exchanging part 30, and the radiator for the electric part 220. Accordingly, the electric parts may be cooled to the temperature of the open air through the heat exchanging part 30 and the radiator for the electric part 220.

Figure 7:
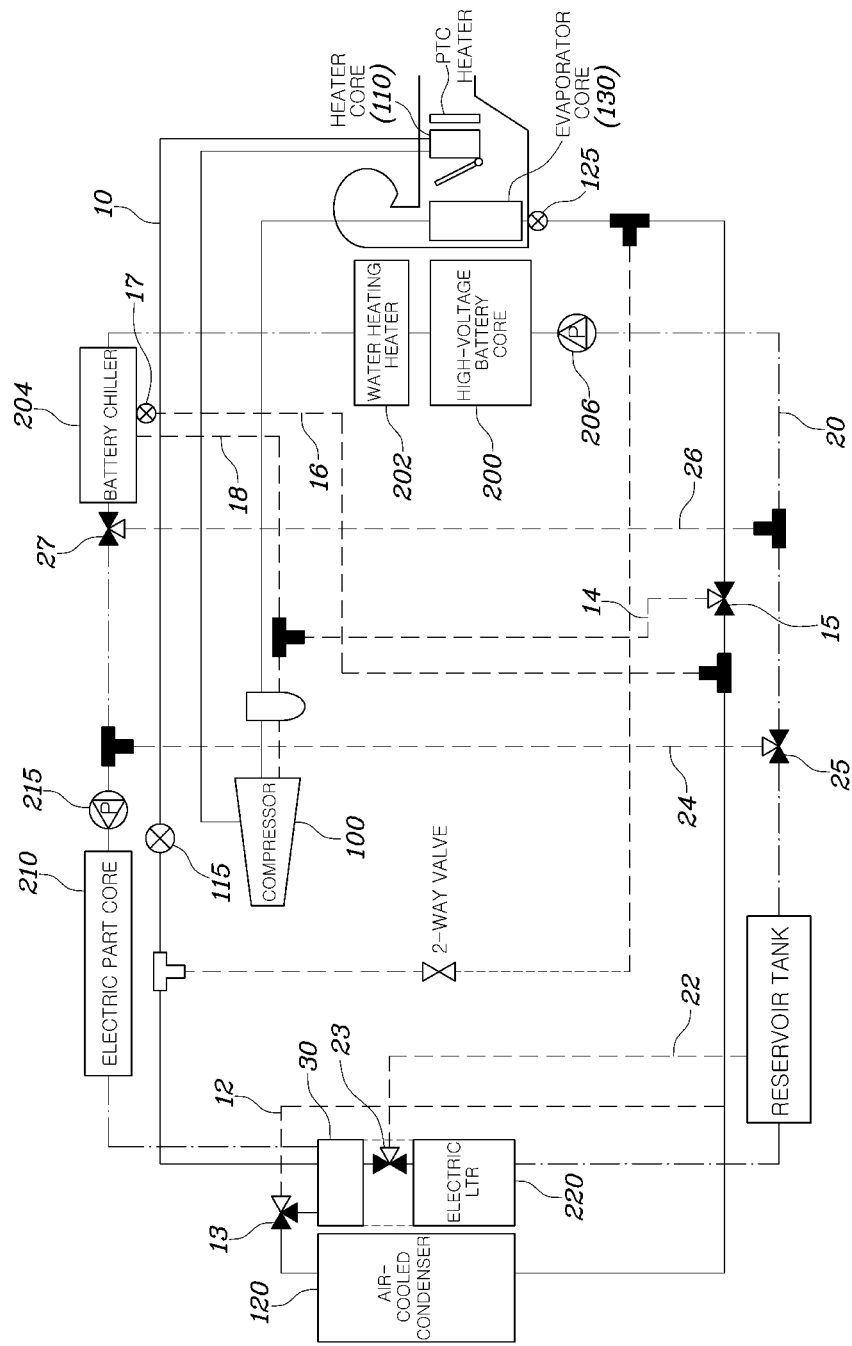
FIG. 7 is a view illustrating an operation of a heating and cooling system for a vehicle when an interior cooling mode including an electric part cooling and a battery water cooling is performed according to embodiments of the present disclosure.

Meanwhile, FIG. 7 is a view illustrating an operation of a heating and cooling system for a vehicle when an interior cooling mode including an electric part cooling and a battery refrigerant cooling is performed according to embodiments of the present disclosure.

When the interior cooling mode including the electric part cooling and the battery water cooling as illustrated in FIG. 7 is executed, the fifth and sixth opening and shutting valves 25 and 27 operate so that the high-voltage battery core 200 and the electric part core 210 form a single coolant closed circuit.

Accordingly, the coolant circulating through the high-voltage battery 200 is cooled through the heat exchanging part 30 and the radiator for the electric part 220, thereby making it possible to cool the battery.

Figure 8:
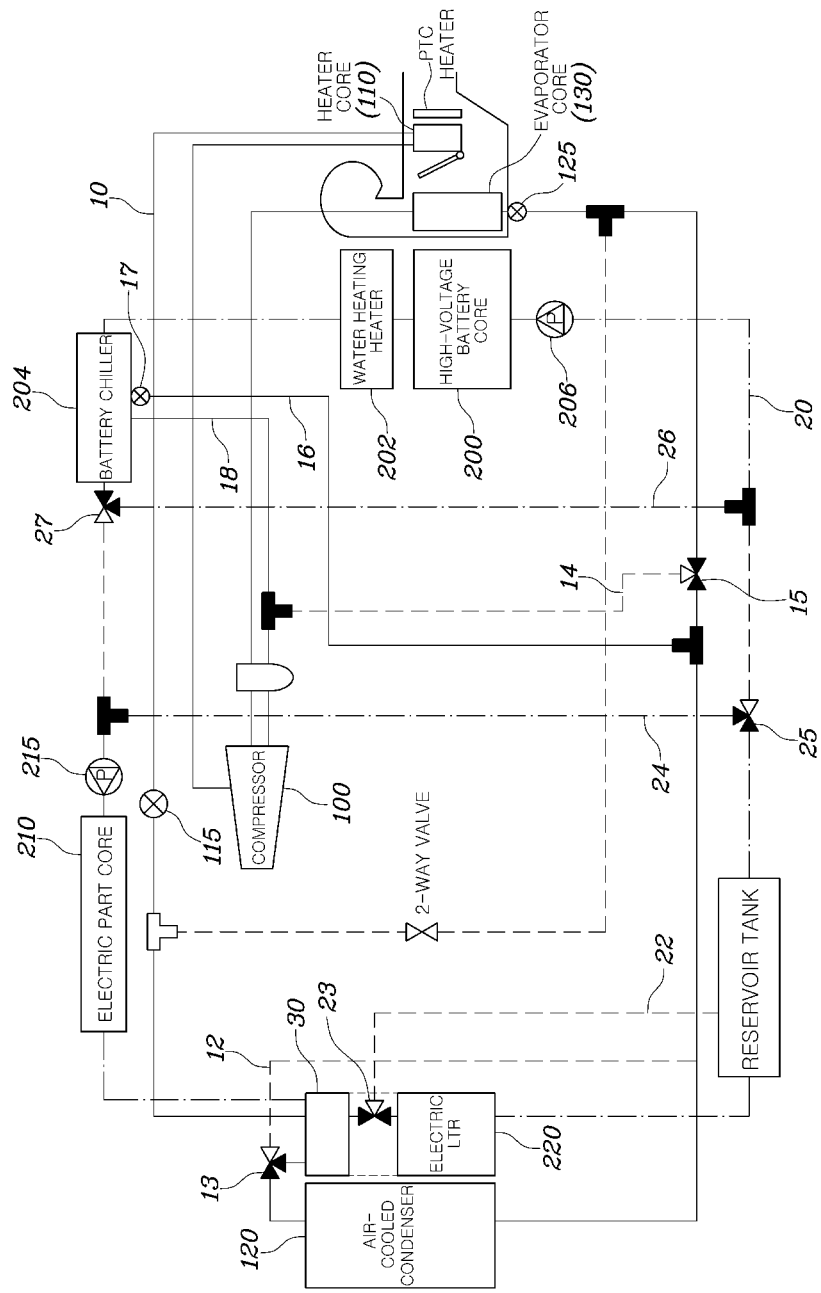
FIG. 8 is a view illustrating an operation of a heating and cooling system for a vehicle when an interior cooling mode including an electric part cooling and a battery refrigerant cooling is performed according to embodiments of the present disclosure.

FIG. 8 is a view illustrating an operation of a heating and cooling system for a vehicle when an interior cooling mode including an electric part cooling and a battery refrigerant cooling is performed according to embodiments of the present disclosure.

As shown in FIG. 8, in the interior cooling mode in which the battery is cooled by the refrigerant, the fourth opening and shutting valve 17 operates to be opened and the fifth and sixth valves 25 and 27 operate so that the high-voltage battery core 200 and the electric part core 210 form coolant closed circuits different from each other.

That is, the coolant circulating through the electric part core 210 is cooled through the heat exchanging part 30 and the radiator for the electric part 220, and the coolant circuiting through the high-voltage battery core 200 is cooled by the battery chiller 204.

In such an interior cooling air-conditioning situation, the temperature control door included in the HVAC system operate so that the air for interior air-conditioning passes through the evaporator core 130, thereby making it possible to perform the interior cooling.

According to the heating and cooling system for a vehicle having the structure as described above, the heat is effectively exchanged depending on a vehicle mode between a refrigerant for interior air-conditioning and a coolant circulating through an electric part and a high-voltage battery through a single heat exchanging part, thereby making it possible to efficiently perform the heating and cooling of the vehicle and the cooling/temperature raising of the high-voltage battery.

Although the present disclosure has been shown and described with respect to certain embodiments, it will be apparent to those having ordinary skill in the art that the present disclosure may be variously modified and altered without departing from the spirit and scope of the present disclosure as defined by the following claims.

What is claimed is:

1. A heating and cooling system for a vehicle, the heating and cooling system comprising:
   a refrigerant line provided to pass through a compressor, an interior heat exchanger for interior air-conditioning, an air-cooled condenser, and an evaporator core for interior air-conditioning, the refrigerant line configured such that a refrigerant flows therethrough;
   a coolant line provided to pass through a high-voltage battery core, an electric part core for an electric part, and a radiator for the electric part, the coolant line configured such that a coolant flows therethrough; and
   a heat exchanging part configured to exchange heat between the refrigerant flowing between the interior heat exchanger and the air-cooled condenser, and the coolant flowing between the electric part core and the radiator,
   wherein a water heating heater and a battery chiller are sequentially provided downstream of the high-voltage battery core on the coolant line.

2. The heating and cooling system of claim 1, further comprising a first refrigerant bypass line having an end branched from a point between the heat exchanging part and the air-cooled condenser and another end connected to a point between the air-cooled condenser and the evaporator core.

3. The heating and cooling system of claim 2, further comprising:
   a first opening and shutting valve provided on a line passing through the first refrigerant bypass line or the air-cooled condenser, the first opening and shutting valve configured to adjust the refrigerant flowing through the first refrigerant bypass line or the air-cooled condenser; and
   a control unit configured to control the first opening and shutting valve so as to deliver the refrigerant to the air-cooled condenser when an interior cooling mode is executed.

4. The heating and cooling system of claim 2, further comprising:
   a first opening and shutting valve; and
   a controller configured to control the first opening and shutting valve so that the refrigerant flows through the first refrigerant bypass line when an interior heating mode using electric waste heat is executed and so that the refrigerant flows through the air-cooled condenser when an interior heating mode using the open air heat is executed.

5. The heating and cooling system of claim 1, further comprising a second refrigerant bypass line having an end branched from a point between the air-cooled condenser and the evaporator core and another end connected to an upstream point of the compressor.

6. The heating and cooling system of claim 5, further comprising:
   a second opening and shutting valve installed at an end of the second refrigerant bypass line, the second opening and shutting valve configured to deliver the refrigerant supplied from the air-cooled condenser to the evaporator core or the second refrigerant bypass line; and a controller configured to control the second opening and shutting valve so as to deliver the refrigerant to the second refrigerant bypass line when an interior heating mode is executed, and to control the second opening and shutting valve so as to deliver the refrigerant to the evaporator core when an interior cooling mode is executed.

7. The heating and cooling system of claim 1, further comprising a first coolant bypass line having an end branched from a point between the heat exchanging part and the radiator and another end connected to a downstream point of the radiator.

8. The heating and cooling system of claim 7, further comprising:

a third opening and shutting valve installed at an end of the first coolant bypass line, the third opening and shutting valve configured to deliver the coolant supplied from the heat exchanging part the radiator or the first coolant bypass line; and a controller configured to control the third opening and shutting valve so as to deliver the coolant to the first coolant bypass line when an interior heating mode is executed, and to control the third opening and shutting valve so as to deliver the coolant to the radiator when an interior cooling mode is executed.

9. The heating and cooling system of claim 1, further comprising:

a battery refrigerant supplying line having an end branched from a point between the air-cooled condenser and the evaporator core and another end connected to the battery chiller to supply the refrigerant to the battery chiller; and a battery refrigerant discharging line connecting the battery chiller to the compressor, the battery refrigerant discharging line configured to supply the refrigerant discharged from the battery chiller to the compressor.

10. The heating and cooling system of claim 9, further comprising:

a fourth opening and shutting valve installed on the battery refrigerant supplying line, the fourth opening and shutting valve configured to control a flow of the refrigerant; and a controller configured to control the fourth opening and shutting valve so as to open only when a battery refrigerant cooling mode is executed.

11. The heating and cooling system of claim 1, further comprising second and third coolant bypass lines each having an end branched from a point between the radiator for the electric part and the high-voltage battery core and another end branched from a point between the electric part core and the battery chiller, the second and third coolant bypass lines connected in parallel to each other.

12. The heating and cooling system of claim 11, further comprising:

a fifth opening and shutting valve installed at an end of the second coolant bypass line, the fifth opening and shutting valve configured to deliver the coolant supplied from the radiator for the electric part to the second coolant bypass line or the high-voltage battery core;

a sixth opening and shutting valve installed at an end of the third coolant bypass line, the sixth opening and shutting valve configured to deliver the coolant supplied from the battery chiller to the third coolant bypass line or the electric part core; and a controller configured to control the fifth and sixth opening and shutting valves so as to deliver the coolant to the second and third coolant bypass lines, respectively, when an interior heating mode and a battery temperature raising mode are executed, or when an interior cooling mode and an electric part cooling mode are executed, or when the interior cooling mode and a battery refrigerant cooling mode are executed.

13. The heating and cooling system of claim 12, wherein the controller is further configured to control the fifth and sixth opening and shutting valves so as to deliver the coolant to the high-voltage battery core and the electric part core, respectively, when the interior heating mode is executed using open air and electric waste heat or using only the electric waste heat, or when the interior cooling mode is executed to cool the radiator and the high-voltage battery core.

14. The heating and cooling system of claim 1, further comprising water pumps provided upstream of the electric part core and the high-voltage battery core on the coolant line, respectively.

\* \* \* \* \*